April 25, 1967   R. T. TYNDALL   3,315,792
VALVE FOR CONVEYORS
Filed Dec. 28, 1965   2 Sheets-Sheet 2
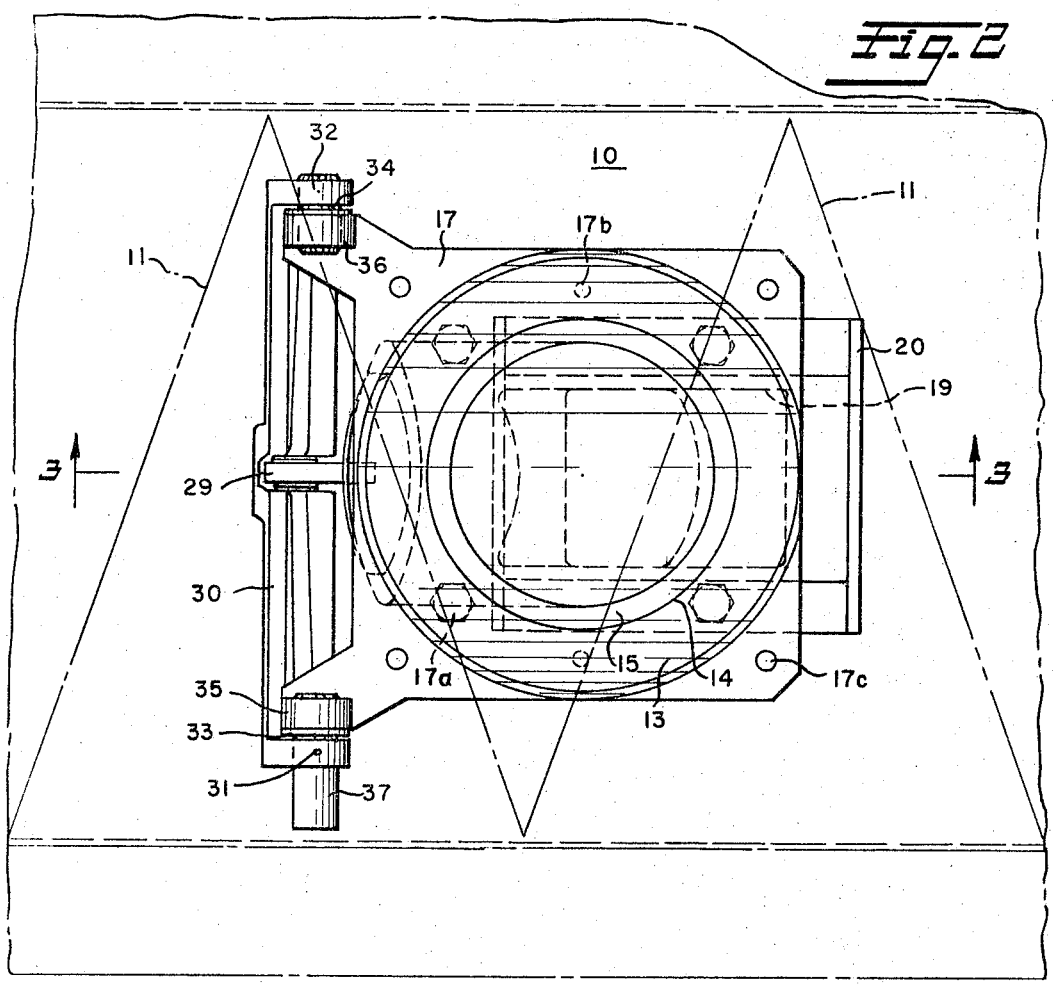
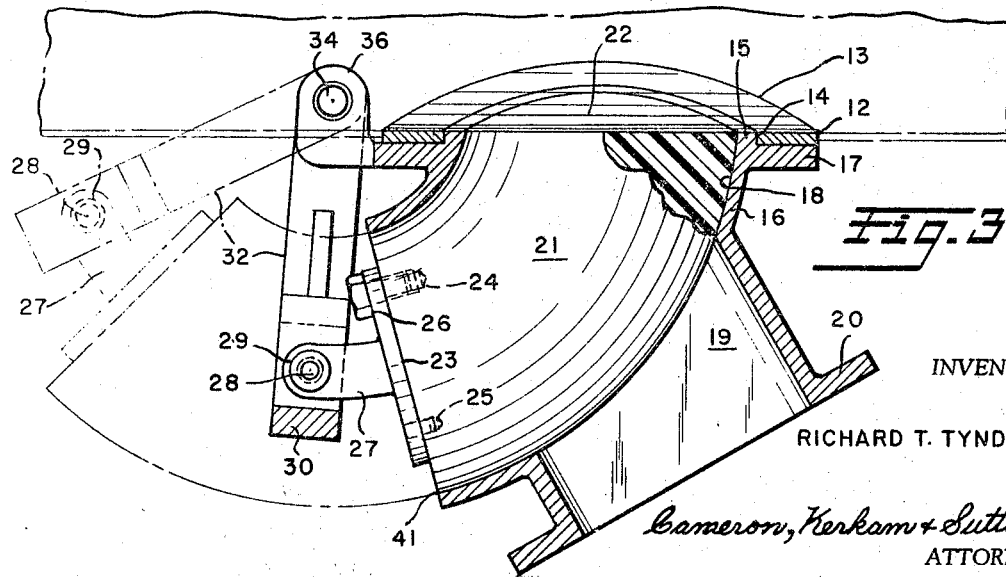
INVENTOR
RICHARD T. TYNDALL
Cameron, Kerkam & Sutton
ATTORNEYS 3,315,792
VALVE FOR CONVEYORS
Richard T. Tyndall, Kailua, Hawaii, assignor to Castle & Cooke, Inc., Honolulu, Hawaii, a corporation of Hawaii
Filed Dec. 28, 1965, Ser. No. 517,010
5 Claims. (Cl. 198—213)

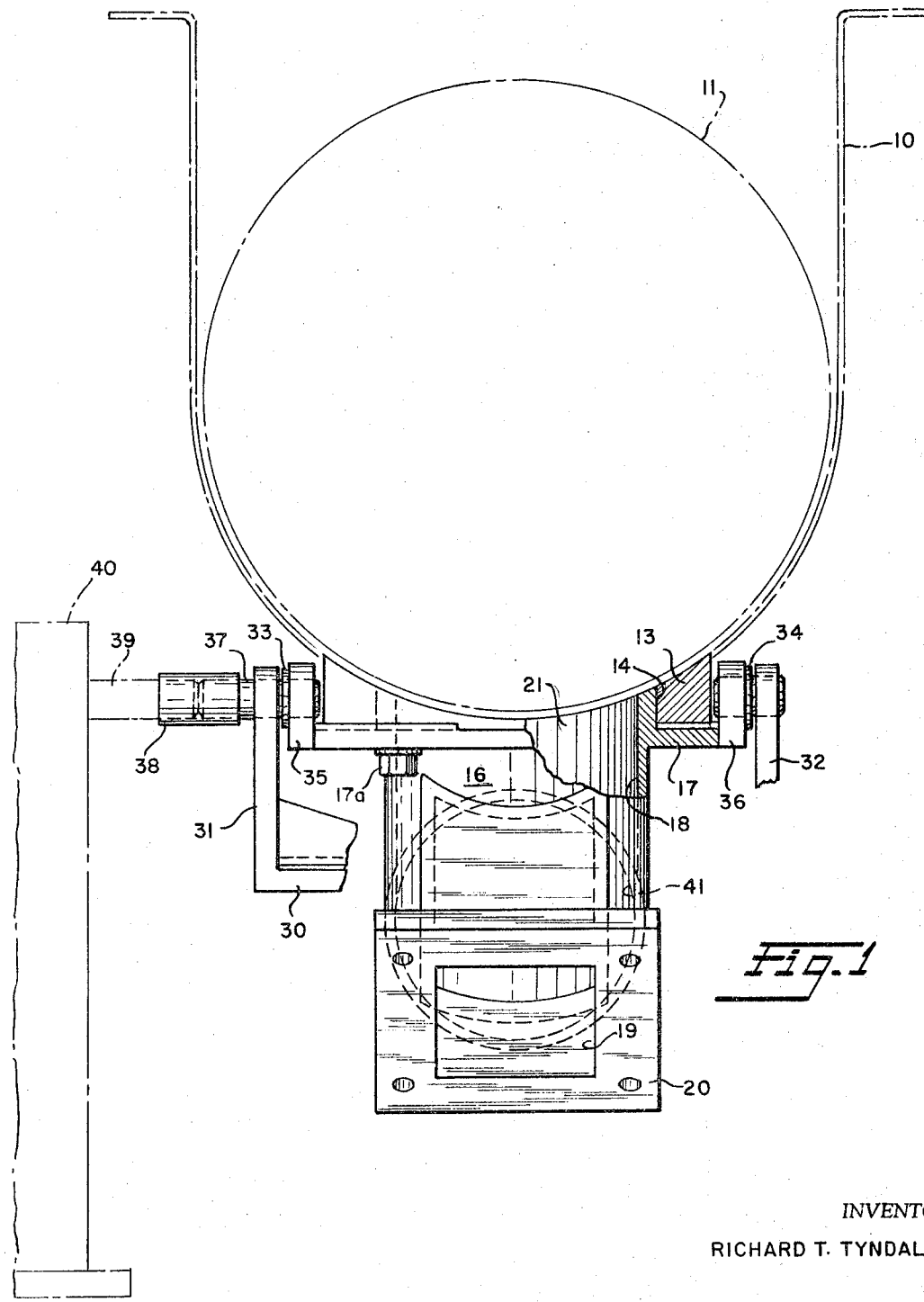

The present invention relates to valves and more particularly to valves suitable for use with screw-type conveyors. Even more particularly the present invention relates to valves for screw-type conveyors used in the conveying of broken pieces of fruit accompanied by liquids and juices from the fruit.

In the pineapple industry broken slices of pineapple, pineapple parings and the like are conveyed from the slicing machines; from the eradicators; and from other stages of the processing of the pineapples either to juice presses; to cutters for preparing crushed pineapple; or to other stages in the preparation and canning of the fruit. It is conventional to convey such portions of fruit and accompanying juices to the desired stages in the further processing thereof by screw-type conveyors working in troughs.

Under the temperature conditions normally experienced in the preparation of pineapple for canning, the pieces, shreds of pineapple and accompanying juices are subject to rather rapid fermentation. Conveyors for pineapple and its juices and valves used with such conveyors for removing the pineapple material therefrom for processing must therefore be easy to clean and without pockets or areas where pineapple or pineapple juices can collect and stand.

Valves used with such conveyors to remove metered amounts of pineapple products from the conveyors must provide as large an opening as possible to provide volume flow of the product through the valve. Such a valve must have no obstructions at the valve opening in the conveyor which would cause a bridging of the pineapple material and block flow through the valve. Such a valve when closed must present a flush surface contiguous with the surface of the conveyor free of pockets or areas in which pineapple or pineapple juices can collect. The valve must have no void spaces where bacteria may grow. The valve should discharge in the same direction as the flow of material in the conveyor and the closure member of the valve should, when partially opened, provide a smooth sloping surface in the direction of flow of the pineapple material through the valve to facilitate passage of the material through the valve for proper metering of the amount thereof. The several components of the valve should fit to close tolerances to prevent leakage of fruit juices around these parts and the valve closure member and valve body should have self-lubricating properties to prevent contamination of the pineapple product passing through the valve while providing an adequate seal between parts when the valve is at any position between fully closed and fully opened.

The valve of the present invention meets all of these requirements by providing a valve body having a circular opening through the bottom of the trough of the conveyor and having a discharge opening having its axis disposed at approximately 60° to the axis of the conveyor with the valve closure member comprising a plug of plastic material having a circular cross-section and a long axis curved on a suitable radius and fitting within an identically shaped chamber in the valve body whereby sliding of the valve plug in the valve body provides valve openings between fully closed and fully opened positions with an end surface of the plug being coextensive with the bottom of the conveyor when closed and providing a deflecting surface for the material passing through the valve when in any of the valve opened positions.

It is therefore an object of the present invention to provide a valve meeting all of the requirements discussed above which valve shall be readily and easily maintained in operating and in sanitary conditions while being of relatively simple construction and therefore relatively cheap and easy to manufacture and install.

The valve of the present invention is capable of various mechanical embodiments one preferred embodiment of which is shown in the accompanying drawings and will be described hereinafter to illustrate the invention. This illustrative embodiment should in no way be construed as defining or limiting the invention.

In the accompanying drawings, in which like reference characters indicate like parts, FIG. 1 is a view looking toward the discharge orifice of the valve as applied to a screw conveyor with a portion of the actuating mechanism for the valve plug broken away for clarity of illustration;

FIG. 2 is a view from above of the valve of FIG. 1 as seen when looking into the conveyor; and FIG. 3 is a cross-sectional view on the lines 3—3 of FIG. 2.

Referring now to the several figures, a conventional trough-type conveyor is represented at 10 and includes a conventional rotatable worm, screw or helix 11 therein for moving the material through conveyor 10. Trough 10 is suitably apertured at 12 to receive valve base 13. Valve base 13 is suitably shaped to fit the contour of conveyor 10 both axially and radially and is suitably secured in opening 12 as by welding or by other suitable means to form a fluid-tight seal therewith.

Valve base 13 is provided with a circular opening 14 which receives annular end 15 of valve body 16. Valve body 16 is provided with an annular flange 17 fitting snugly beneath valve base 13 and is suitably secured thereto as by machine screws 17a and pins 17b. Annular extension 15 and annular flange 17 form a fluid-tight seal with base 13. Bolt holes 17c in flange 17 may be used to mount auxiliary equipment.

Valve body 16 is provided with a plug chamber 18 of circular cross-sectional perpendicular to the long axis thereof and having the long axis thereof disposed along a curve of fixed radius. Plug chamber 18 opens through annular extension 15 into conveyor 10 and opens at 41 through body 16. Valve body 16 is provided with discharge orifice 19 opening into chamber 18 and having a long axis disposed at approximately 60° to the long axis of conveyor 10 and so disposed as to discharge in the same direction as the direction of flow in conveyor 10. Discharge orifice 19 terminates in flange 20 for connecting valve body 16 to suitable pipes or conveyors for the material discharged through the valve. Discharge orifice 19 may be of any suitable configuration and is here shown as rectangular in cross-section to provide for an unrestricted flow of material therethrough without the formation of pockets or voids in which fruit material could collect and ferment.

Plug chamber 18 receives valve plug 21 of torus shape with a close sliding fit. Valve plug 21 is machined to close tolerances and conforms to the shape of chamber 18 both in cross-section and in radius of curvature of its long axis to provide the aforesaid close sliding fit in plug chamber 18. Plug 21 is made of suitable rigid material such as a plastic. This plastic material is preferably a thermoplastic resin which is hard and rigid when set mixed with a tetrafluoroethylene polymer to provide lubricity to the rigid, hard resin material. Such a resin mixture has inherent lubricity and when chamber 18 has a smooth finish and the external surface of plug 21 carefully machined, plug 21 will operate smoothly in opening and closing of the valve in spite of the close tolerances which prevent leakage around plug 21. A hydroscopic liquid film may be supplied between plug 21 and chamber 18 for further lubrication, if desired, and this film provides a self-sealing action within the valve when the valve is in closed position. When in closed position plug 21 extends from opening 41 to annular extension 15.

Valve plug 21 is provided with an end surface 22 shaped to conform to the inner surface of conveyor 10 when the valve is in closed position so that the flights of conveyor 11 can move thereover with no pockets or voids being formed between surface 22 and the inner surface of conveyor 10.

Plug 21 has an end surface 23 disposed at right angles to the long axis of plug 21. A metal base 24 is suitably centered on end 23 by centering pin 25 and is suitably secured thereto as by lag bolt 26. Base 24 carries finger 27 which is through bored at 28 to receive pin 29 pivotally connecting the same to cross arm 30. Cross arm 30 is supported by spaced parallel connecting arms 31 and 32 which are in turn pivotally mounted at 33 and 34, respectively, to ears 35 and 36 formed as extensions of flange 17. Shaft 37 is connected through coupling 38 to shaft 39 of any suitable actuating motor or mechanism 40 and shaft 37 is secured to arm 31 and forms pivot 33. Suitable actuation of mechanism 40 then rotates shafts 39 and 37 which rotate arms 31 and 32 and cross arm 30 about pivots 33 and 34 which rotation is transmitted through pin 29 and finger 27 to base 24 and to plug 21 sliding plug 21 in chamber 18 to any desired position from valve fully closed to valve fully opened positions.

Surface 22 of plug 21, when the valve is in any of its opened positions, forms a smooth deflecting surface over which the material from conveyor 10 passes preventing bridging of the valve orifice at 15 and permitting close metering of the volume of discharge through the valve. When the valve is fully opened surface 22 lies at a 60° angle to the long axis of conveyor 10 and provides no obstruction to the passage of material through the valve.

When the valve closes surface 22 acts as a piston forcing any material lodged between surface 22 and the wall of chamber 18 upwardly and back into trough 10 for removal by conveyor 11. No pockets or voids are formed when the valve is in closed position thus minimizing fermentation in and about the valve structure.

The hot caustic solution used for cleaning conveyor 10 and its valves will not affect the actuation or operation of the valve. The valve is readily cleaned by passing the caustic solution therethrough without requiring disassembly of the valve components.

It should now be apparent that the valve of the present invention in every way satisfies the several objectives discussed above.

Changes in or modifications to the above-described illustrative embodiment of the present invention may now be suggested to those skilled in the art without departing from the present inventive concept. Reference should therefore be had to the following claims to determine the scope of this invention.

What is claimed is:

1. In combination with a conveyor, an opening in the bottom of the conveyor, a valve housing closing said opening, a valve chamber in said housing opening through said opening and opening through said housing, said chamber being circular in cross-section and having its long axis disposed on a curve of equal radii, a discharge orifice in said housing opening into said chamber, a valve plug slidably mounted in said valve chamber of sufficient length when in closed position to fill said chamber; to close said opening; and to close said discharge orifice, the end of said plug adjacent said opening conforming to the shape of the adjacent portion of the conveyor and means for sliding said plug in said chamber.

2. The combination described in claim 1, the conveyor being an open trough and a screw feed mounted in said trough passing over the shaped end of said plug when said plug is in closed position.

3. The combination described in claim 1, said plug being of rigid plastic material having inherent lubricity.

4. The combination described in claim 1, said discharge orifice having its long axis disposed at about 60° to the long axis of the conveyor and opening in the same direction as the direction of flow in the conveyor, said plug first closing said orifice and then closing said opening when moved from open to closed position.

5. The combination described in claim 4, said shaped end of said plug being disposed at an angle of about 60° to the long axis of the conveyor when in open position and forming a deflecting surface for material passing from the conveyor through said chamber and through said orifice.

References Cited by the Examiner

UNITED STATES PATENTS

| | | | |
|---|---|---|---|
| 174,617 | 3/1876 | Caldwell | 198—213 |
| 1,373,659 | 4/1921 | Harding | 198—66 |
| 3,020,018 | 2/1962 | Stram | 251—144 X |
| 3,115,159 | 12/1963 | Yasui | 251—324 X |
| 3,142,474 | 7/1964 | Nelson | 251—368 X |
| 3,201,082 | 8/1965 | Rosen | 251—368 |
| 3,206,530 | 9/1965 | Boteler | 251—368 X |

EVON C. BLUNK, *Primary Examiner.*

M. L. AJEMAN, *Assistant Examiner.*